July 17, 1962 H. LESCURE 3,044,388
PRESSURE COFFEE POTS
Filed Oct. 26, 1959 5 Sheets-Sheet 1

INVENTOR
HENRI LESCURE
By Irwin S. Thompson
ATTY.

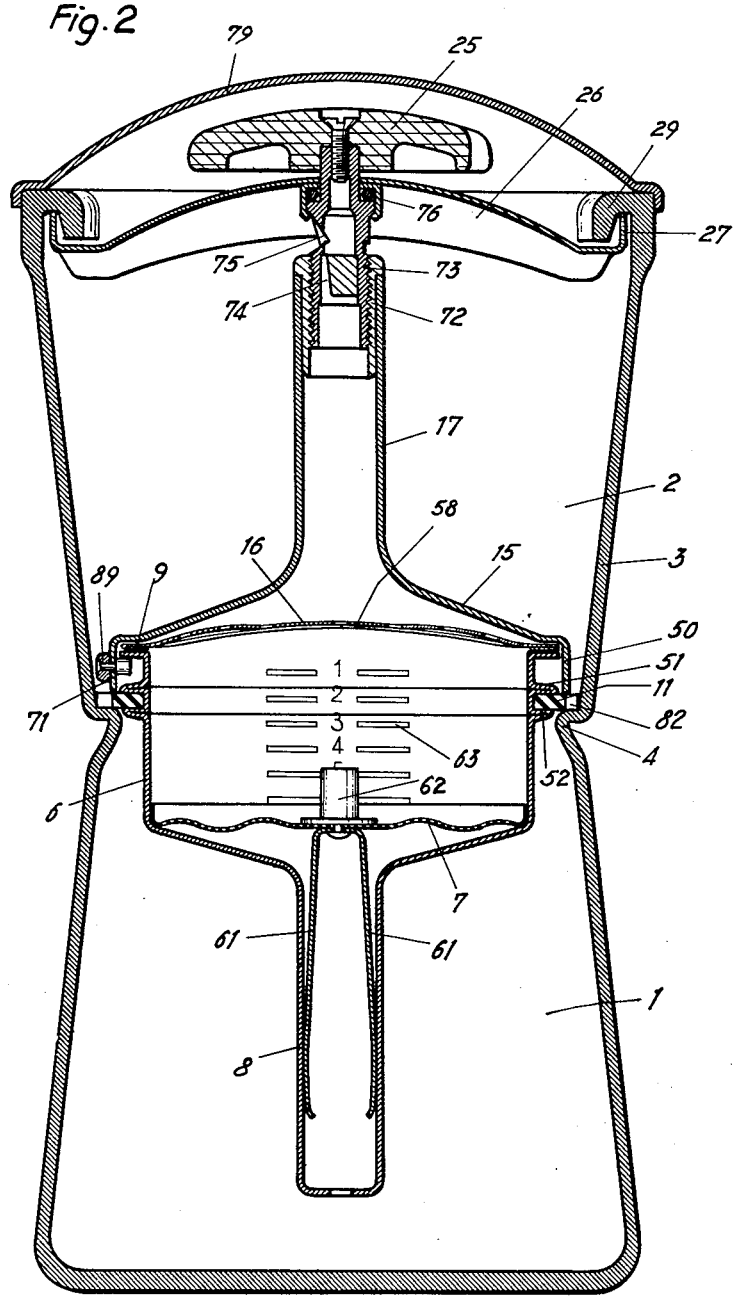

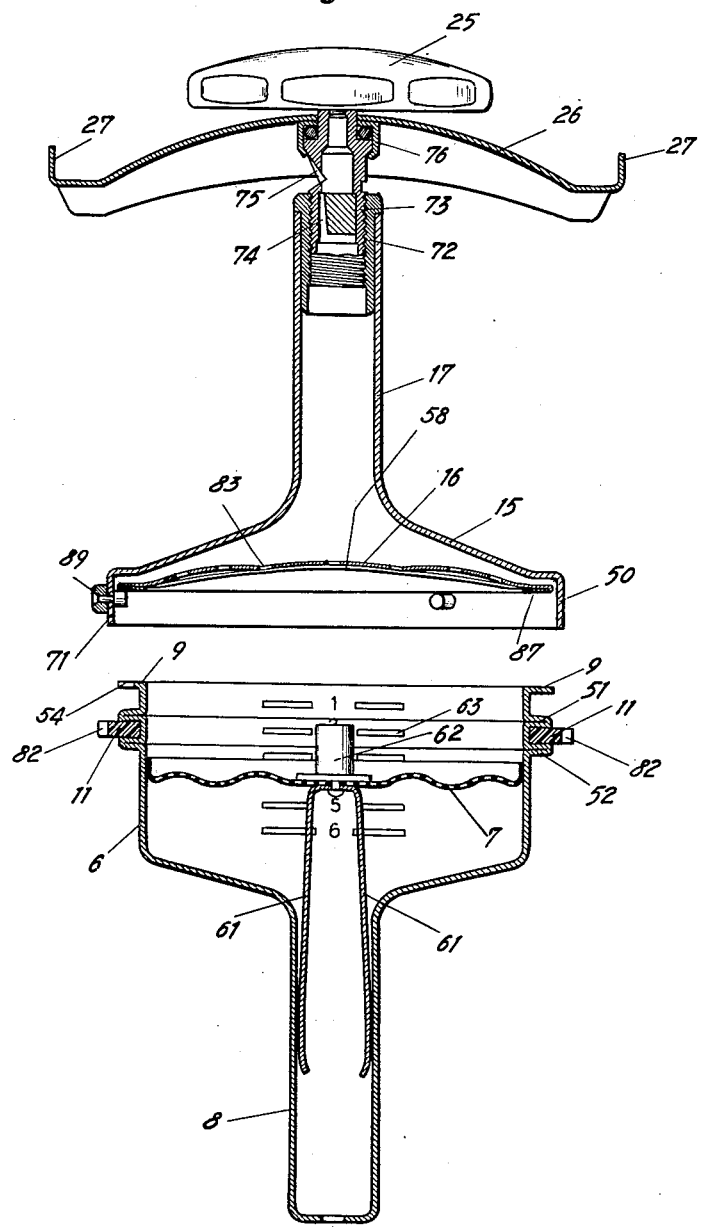

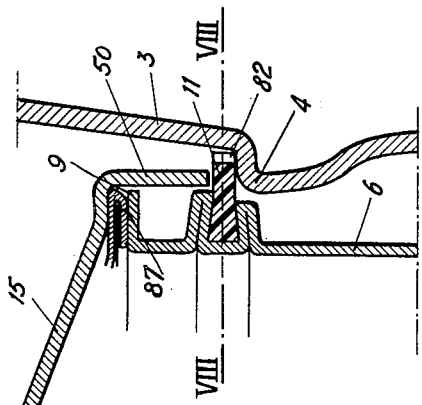
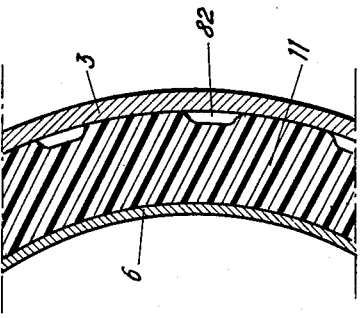
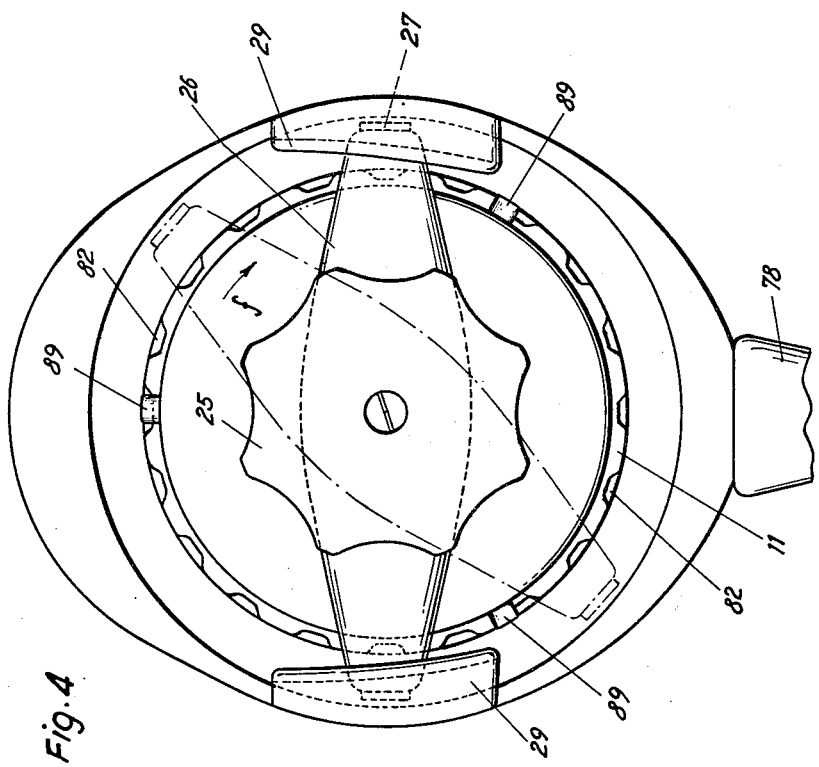

July 17, 1962 H. LESCURE 3,044,388
PRESSURE COFFEE POTS
Filed Oct. 26, 1959 5 Sheets-Sheet 5

INVENTOR
HENRI LESCURE
By Irwin S. Thompson
ATTY.

United States Patent Office 3,044,388
Patented July 17, 1962

3,044,388
PRESSURE COFFEE POTS
Henri Lescure, Selongey, France
Filed Oct. 26, 1959, Ser. No. 848,827
Claims priority, application France Nov. 21, 1958
8 Claims. (Cl. 99—285)

There are already known coffee-pots the body of which comprises a lower vessel and an upper vessel which are separated by a basin containing the ground coffee, said basin carrying two opposite flues which open onto the lower and upper vessels, respectively.

In apparatus of this kind, as the coffee-pot is heated after water has been poured into the lower vessel, the water is caused to rise through the lower flue of the basin and to force its way through the ground coffee, thereby becoming saturated with coffee, and then flows upward through the upper flue, wherefrom it drops into the upper vessel. The coffee infusion obtained has then merely to be poured into cups.

With coffee-pots of this kind, it is possible to produce a coffee of very high quality, but several drawbacks are encountered in that many parts have to be assembled and disassembled every time the coffee-pot is used, these parts being hard to assemble, and in that the lower vessel is insufficiently fluid-tight, which may hinder the upward movement of water, or even may cause an explosion in case of obstruction, the latter risk being particularly serious.

This invention aims at obviating such drawbacks.

According to the invention, the basin containing ground coffee rests by means of a tight packing ring on a seat formed in the coffee-pot body between the lower and upper vessels and is urged against this seat by a resilient cross-beam bearing on the body, the basin being thus allowed to rise in case of an overpressure occurring in the lower vessel, thereby acting as a safety valve.

According to a preferred embodiment, the member urging the basin on its seat consists of a relatively resilient U-shaped cross-beam which is rotatably fitted on the upper flue and can bear with its opposite ends on two lugs provided in the coffee-pot body.

The fitting of the cross-beam to the upper flue is preferably made through a hand operable height adjustment screw in threading engagement with said upper flue. By screwing or unscrewing this screw it is possible, by axial displacement of said cross-beam, the ends of which engage the lugs of the upper vessel, to develop an elastic and adjustable force tightening the basin and its ring onto the seat. As the cross-beam is elastic in nature, if the pressure in the lower vessel exerts on the basin a counterforce of greater magnitude than the tightening force, the basin is raised, the steam causing the overpressure escapes and, as soon as the overpressure has ceased, the basin is again urged onto the seat by the cross-beam. A discharge of excess steam in this manner may happen several times in a single operation in case of obstruction of the basin, without any damage to the coffee-pot and even without being noticed by the user. On the other hand, as the cross-beam and height adjustment screw are permanently borne by the upper flue, a very quick, handy and clean operation of the coffeepot is made possible.

Other particular features of the invention will appear from the following description of a particular form of construction, given with reference to the accompanying drawings.

In the drawings:

FIG. 2 is a vertical section of the complete coffee-pot.

FIG. 3 is an elevational partial sectional view showing separately, on the one hand, the basin with its lower flue and, on the other hand, the basin cover with the upper flue and the cross-member.

FIG. 4 is a plan view of the coffee-pot, assuming that the body cover has been removed.

FIG. 7 is a detailed vertical sectional view on an enlarged scale showing the arrangement of the notched washer with respect to the coffee-pot body.

FIG. 8 is a corresponding horizontal section taken along VIII—VIII of FIG. 7.

Figure 1:
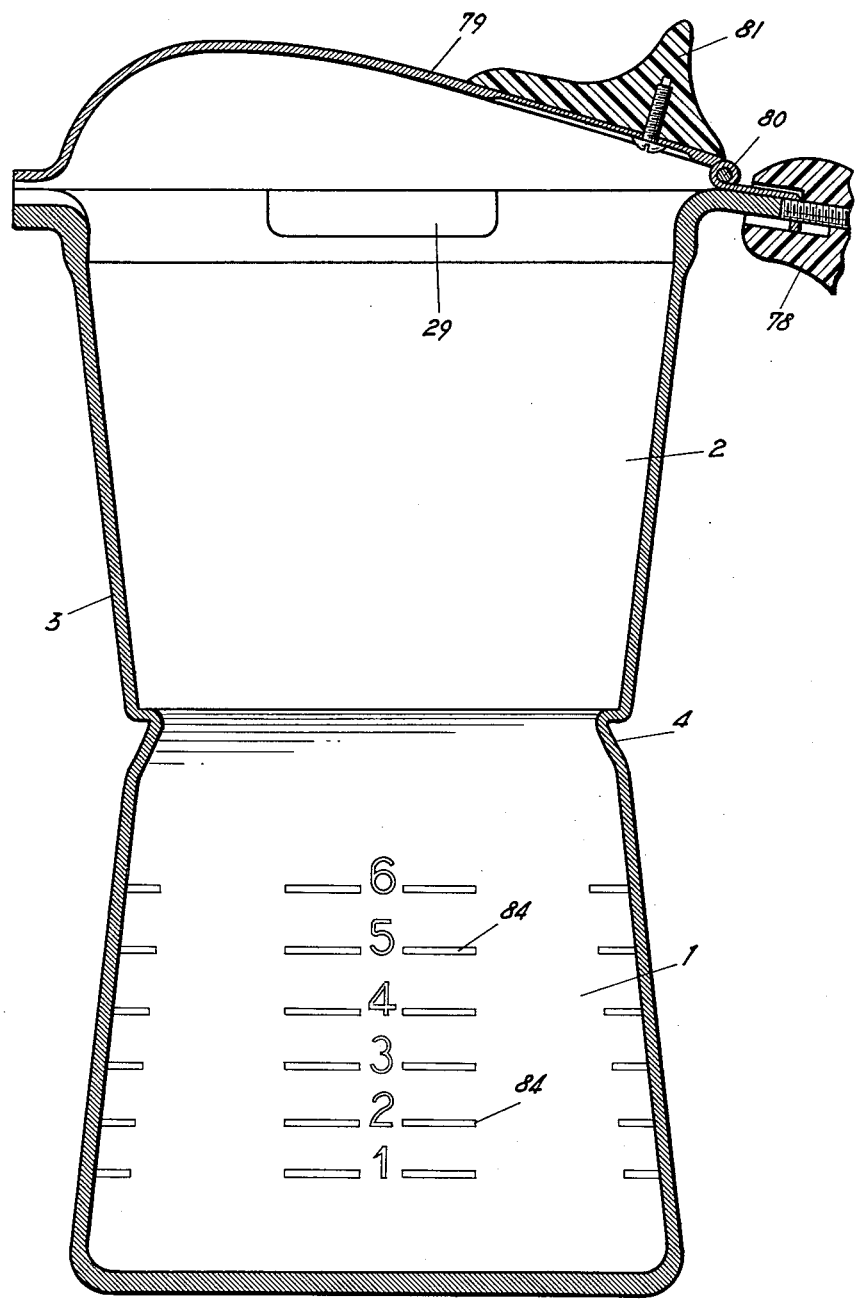
FIG. 1 is a vertical section of the coffeepot body after removal of the internal parts.
Figure 5:
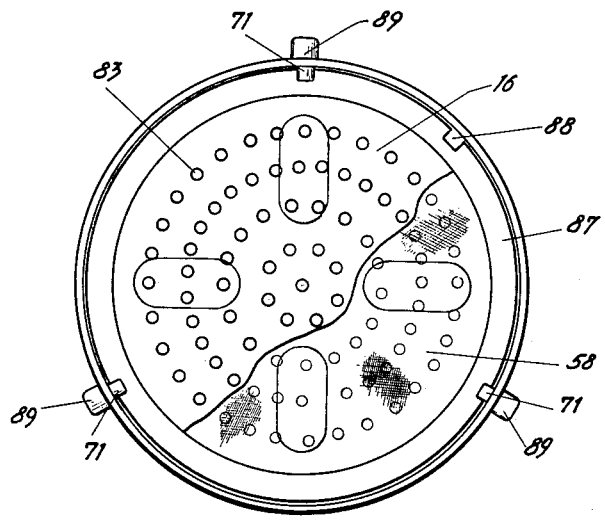
FIG. 5 is a view from beneath the basin cover and of the upper grid.
Figure 6:
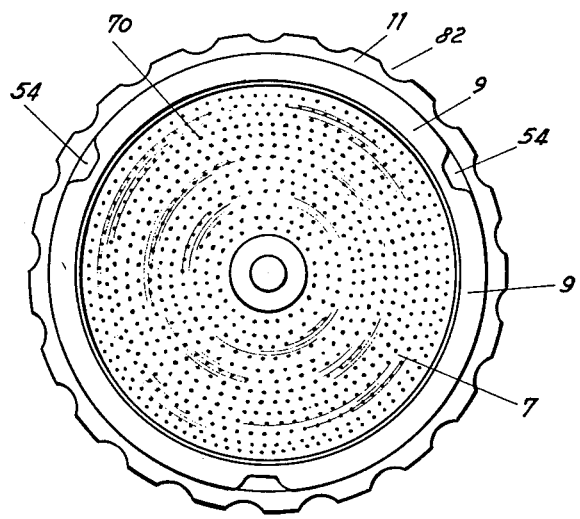
FIG. 6 is a plan view of the basin.

In the drawings, the reference numerals 1 and 2 respectively designate the lower and upper vessels formed in the body 3 of the coffee pot which has in the middle of its length a reduced portion 4 forming, within the body, the seat for the basin 6, the latter being intended for receiving the ground coffee and being integral with the lower flue 8.

Overlying the basin 6 is a cover 15 formed in one piece with the upper flue 17. When in operating condition, the cover 15 is connected to the basin 6 through a bayonet connection, being provided for this purpose (FIGS. 2 and 3) with pins 71 which engage the lip 9 of the basin 6. Provided in said lip for allowing passage of the pins 71 are notches 54 which make it possible to remove the cover 15 from the basin 6 after an angular relative displacement of suitable value.

In the embodiment shown in the drawings, the upper portion of the upper flue 17 has an internal righthand thread 72 which is in threading engagement with a threaded sleeve 73, connected with the operating knob 25.

For allowing the passage of the liquid, the sleeve 73 is formed with a narrow duct 74 and with an opening 75 which is bevelled so as to constitute a whistle.

Mounted loose on the sleeve 73 are an annular flange 76, overlying a ball-bearing, and a resilient cross-beam 26 having a U-shaped cross-section, the end portions 27 of which are up-turned to engage lugs 29 formed on the inner surface of the body 3.

The cross-beam 26 is thus rotatably fitted on the threaded sleeve 73 and may be turned about the longitudinal axis of the assembly shown in FIG. 3, which comprises the basin 6 and its lower flue 8, the cover 15 and its upper flue 17.

Similarly, upon turning the knob 25, the cross-beam 26 is displaced axially (i.e., vertically in FIGS. 2 and 3), regardless of the particular orientation or angular disposition of cross-beam 26.

The upper portion of the body 3 is fitted with an insulating handle 78 (FIG. 1) and with a cover 79 having a horizontal pivotal connection, said cover being provided with an insulating block 81 allowing it to be raised.

The basin 6 has two external circular ribs 51 and 52, a resilient washer 11 (FIGS. 2, 3, 7 and 8) being clamped therebetween and bearing against the seat formed by the reduced portion 4 of the body 3. Overlying this washer is the descending rim 50 forming the lower portion of the basin cover. The washer 11 forms a tight joint between the lower vessel 1 and the upper vessel 2.

All around the periphery of washer 11 are a certain number of notches 82. With this arrangement, should an over-pressure build up in the lower vessel 1, basin 6 rises, and washer 11 leaves the reduced portion 4 of the body so that steam from the vessel 1 will be allowed to escape through the notches 82 and the pressure is thus reduced and any danger is avoided.

Moreover, it will be appreciated that the washer 11 cannot be carried along by the steam since it is anchored, both by being set between the circular ribs 51, 52 of the basin 6 (FIG. 7) and by bearing on the internal surface of body 3 through the several extensions lying between the notches 82.

On the other hand, owing to the construction of the vessels 1 and 2 in one piece, a perfect fluid-tightness is provided in the coffee-pot. The provision of a single washer 11 forming a seal both between vessels 1 and 2 and between the basin 6 and its cover 15 permits an easy replacement of said packing in case of impairment thereof.

In the portion of body 3 forming the lower vessel 1, the internal surface has reference marks 84 (FIG. 1) indicating the various levels up to which water has to be poured into body 1 according to the number of cups to be filled.

The basin 6 contains a lower grid 7 which is formed with small holes and is fastened at its center to a projection 62 and to two resilient arms 61 engaging the internal surface of the lower flue 8 in such a manner as to maintain the grid in the selected position according to the number of cups required. The grid has an upwardly directed edge which is applied against the internal surface of the basin. While holding the projection 62, it is possible for one to displace the grid along the basin axis. Reference marks 63 provided on the internal surface of the basin and cooperating with the peripheral edge of the grid 7 show the suitable height at which the grid is to be located according to the number of cups to be filled.

Disposed beneath the basin cover 15 is another grid 16 formed, as shown in FIG. 3, with holes 83 and provided on its lower side with a very fine filtering gauze 58, the periphery of which is clamped in the turned back border 87 of grid 16.

The gauze 58 ensures a perfect filtering of the coffee infusion and prevents solid particles of the ground coffee in basin 6 from being carried along.

The upper grid 16 is kept adjacent to the cover 15 of the basin by the pins 71 of the bayonet connection ensuring the fixation of the cover 15 on the basin.

A notch 88 provided in the border 87 of the grid 16 permits the removal of said grid by rotating it so as to clear it successively from each pin 71.

The bosses formed externally of the descending rim 50 by the heads 89 of the bayonet connection pins 71 are very accurately defined, so that these heads ensure the centering of the basin 6 with respect to the body 3.

The coffee-pot according to the invention is used as follows:

After the internal assembly comprising the basin 6 with its two flues 8 and 17 and the cross-beam 26 have been removed from the body 3, water is poured into this body up to the reference mark 84 corresponding to the number of cups to be filled.

The cover 15 having been removed from the basin 6, the lower grid 7 is placed in such a manner that its rim is aligned with the reference mark 63 corresponding to the desired number of cups. As the grid 7 is maintained at such level by the engagement of the arms 61 with flue 8, ground coffee is poured onto the grid 7 up to the peripheral lip 9 of the basin without any squeezing pressure. The basin cover 15 is thereafter put in place by insertion of the pins 71 into the notches 54 and by rotation of the cover around its axis.

The internal assembly 8, 6, 15, 17, 26 is then introduced into the body 3, the cross-beam 26 is pivoted in such a manner as to engage the lugs 29 and the knob 25 is thereafter rotated in the direction of the arrow on FIG. 4 until the cross-beam 26 is held against rotary movement. The turning of the knob 25 is performed until a reasonable tightening force is exerted on the washer 11 to urge the latter against seat 4. This tightening force results from the increase of the axial distance between the sleeve 73 and the seat 4, due to the unscrewing of sleeve 73 within thread 72, and the corresponding resilient bending of the cross-beam 26.

The coffee-pot is then put on the fire, so as to heat the water contained in the lower vessel 1. The steam pressure in this vessel causes the water to rise through the flue 8. This water thus forces its way through the ground coffee in the basin and the infused liquid ascends in flue 17, then overflows through opening 75 and is collected in the upper vessel 2.

When the water level drops under the lower end of flue 8, only steam is further fed to the latter. By expanding in the upper portion of flue 17, this steam emits a whistle, whereby the user is warned that the heating has to be discontinued to prevent the coffee from boiling.

During operation, should the pressure in the lower vessel exceed a given value, for example if water circulation is hindered by some obstruction, the basin 6 is raised, due to the resiliency of the cross-beam 26, and the steam is thus allowed to escape into vessel 2, thereby avoiding any risk of explosion. The safety factor is further increased by the provision of the notches 82 in the washer 11 surrounding the basin 6.

What is claimed is:

1. In a pressure coffee pot comprising a body having a lower vessel and an upper vessel with inner lugs at the upper periphery thereof, said body being provided with a constriction at the juncture of the upper and lower vessels forming an internal seat, said coffeepot further having a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, axially resilient securing means adjustably mounted on said upper flue for removable engagement with said inner lugs of said upper vessel, and adjustment means rotatably fitted on said upper flue in engagement with said securing means for imparting an axial displacement thereto up to the engagement thereof with said inner lugs.

2. A pressure coffee pot comprising a body having a lower vessel and an upper vessel, said upper vessel containing inner lugs at the upper periphery thereof, said body further having a constriction at the juncture of the upper and lower vessels forming an internal seat, said coffeepot further having a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, said upper flue further bearing a substantially radial U-shaped resilient cross-beam rotatably fitted thereon and adapted for removable engagement with said lugs of said upper vessel, and means on said upper flue for axially displacing said cross-beam relatively to said upper flue up to the engagement of said cross-beam with said inner lugs.

3. A pressure coffee pot comprising a body having a lower vessel and an upper vessel, said upper vessel containing inner lugs radially projecting at the upper periphery thereof, said body further having a constriction at the juncture of the upper and lower vessels forming an internal seat, a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, said upper flue further having a threaded member axially fitted thereon and in threading engagement therewith, a substantially radial U-shaped resilient cross-beam, idly and rotatably fitted on said threaded member and adapted for removable engagement with said lugs of said upper vessel, and an operating knob fitted on said threaded member for movement thereof within said upper flue.

4. A pressure coffee pot comprising a body having a lower vessel and an upper vessel, said upper vessel containing inner lugs radially projecting at the upper periphery thereof, said body further having a constriction at the juncture of the upper and lower vessels forming an internal seat, a removal internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, said upper flue further having a threaded sleeve axially fitted thereon and in threading engagement therewith, a duct within said sleeve in communication with said upper vessel and with said basin through said upper flue, a substantially radial U-shaped resilient cross-beam idly and rotatably fitted on said threaded sleeve, upturned end portions on said cross-beam adapted for removable engagement with said inner lugs, and an operating knob fitted on said sleeve for threading movement thereof within said upper flue.

5. A pressure coffee pot comprising a body having a lower vessel and an upper vessel, said upper vessel containing inner lugs radially projecting at the upper periphery thereof, said body further having a constriction at the juncture of the upper and lower vessels forming an internal seat, a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, said upper flue further having a threaded sleeve axially fitted thereon and in threading engagement therewith, a duct within said sleeve in communication with said upper vessel and with said basin through said upper flue, means for producing whistling upon the flow of steam through said upper flue, said whistling means comprising a throttle within said duct and a bevelled opening at the outlet of said duct into said upper vessel, a substantially radial U-shaped resilient cross-beam idly and rotatably fitted on said threaded sleeve, means on said cross-beam for removable engagement with said inner lugs, and an operating knob fitted on said sleeve for threading movement thereof within said upper flue.

6. A pressure coffee pot comprising a body having a lower vessel and an upper vessel, said upper vessel containing inner lugs radially projecting at the upper periphery thereof, said body further having a constriction at the juncture of the upper and lower vessels forming an internal seat, a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, adjustable means permanently fitted on said upper flue for resiliently and removably tightening said elastic washer of said assembly onto said seat, said tightening means comprising a resilient cross-beam rotatably fitted on said upper flue and axially displaceable relative thereto, means on said cross-beam for removable engagement with said lugs upon longitudinal displacement of said cross-beam relative to said upper flue and hand operable means fitted on said upper flue to adjust said axial displacement of said cross-beam relative to said upper flue and upper vessel.

7. A pressure coffee pot comprising a body having a lower vessel and an upper vessel, said upper vessel being provided with inner lugs radially projecting at the upper periphery thereof, said body further having a constriction at the juncture of the upper and lower vessels forming an internal seat, a removable internal assembly comprising a basin for ground coffee having a flue extending downwardly into and opening in the lower vessel, a cover for the basin having a flue extending upwardly into and opening in the upper vessel and detachably connected to the basin, an elastic washer surrounding the basin and projecting outwardly therefrom resiliently engaging the said seat, said washer having a plurality of notches located at the outer periphery thereof, adjustable means permanently fitted on said upper flue for resiliently and removably tightening said elastic washer of said assembly against said seat, said tightening means comprising a resilient cross-beam rotatably fitted on said upper flue and axially displaceable relative thereto, means on said cross-beam for removable engagement with said lugs upon axial displacement of said cross-beam relative to said upper flue and hand operable means fitted on said upper flue to adjust said axial displacement of said cross-beam and the resulting tightening pressure upon said notched washer.

8. A pressure coffee pot comprising a body having a lower vessel and an upper vessel, said upper vessel being provided with inner lugs radially projecting at the upper periphery thereof, said body further having a constriction at the juncture of the upper and lower vessels forming an internal seat, a removable internal assembly comprising a basin for ground coffee having a flue extending downwardly into and opening in the lower vessel, said basin containing a grid adapted to receive ground coffee vertically adjustably positioned therein and provided with elastic arms extending downwardly therefrom and engaged in said lower flue, and reference marks on the interior surface of the basin to indicate the position of the grid in said basin, a cover for the basin having a flue extending upwardly into and opening in the upper vessel and detachably connected to the basin, an elastic washer surrounding the basin and projecting outwardly therefrom resiliently engaging the said seat and serving as a safety valve, said upper flue further bearing a substantially radial U-shaped resilient cross-beam rotatably fitted thereon, said cross-beam having ends adapted for removable engagement with said lugs of said upper vessel and means on said upper flue for vertically displacing said cross-beam relative to said upper flue up to the engagement of said cross-beam with said lugs.

References Cited in the file of this patent

UNITED STATES PATENTS

| | | |
|---|---|---|
| 512,675 | Appleberg | Jan. 16, 1894 |
| 2,120,860 | Ehlers | June 14, 1938 |

FOREIGN PATENTS

| | | |
|---|---|---|
| 451,675 | Italy | Sept. 23, 1949 |
| 523,526 | Italy | Apr. 16, 1955 |
| 1,134,036 | France | Nov. 26, 1956 |
| 1,171,363 | France | Oct. 6, 1958 |